(12) United States Patent
Li

(10) Patent No.: US 12,365,079 B2
(45) Date of Patent: Jul. 22, 2025

(54) HANDHELD GARDEN TOOL

(71) Applicant: Nanjing Chervon Industry Co., Ltd., Nanjing (CN)

(72) Inventor: Li Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 541 days.

(21) Appl. No.: 17/859,120

(22) Filed: Jul. 7, 2022

(65) Prior Publication Data

US 2023/0023228 A1 Jan. 26, 2023

(30) Foreign Application Priority Data

Jul. 16, 2021 (CN) .......................... 202110806671.7

(51) Int. Cl.
  *B25F 5/02* (2006.01)
  *A01G 3/053* (2006.01)
(52) U.S. Cl.
  CPC ................ *B25F 5/02* (2013.01); *A01G 3/053* (2013.01)
(58) Field of Classification Search
  None
  See application file for complete search history.

(56) References Cited

U.S. PATENT DOCUMENTS

| | | | | |
|---|---|---|---|---|
| 4,616,169 A * | 10/1986 | Proffitt | ................... | H02J 7/0045 30/DIG. 1 |
| 8,312,937 B2 * | 11/2012 | Turner | ................ | H01M 50/247 173/217 |
| 9,713,880 B2 * | 7/2017 | Haneda | ................... | B27B 17/02 |
| 2011/0197389 A1 * | 8/2011 | Ota | .................... | H02J 7/007182 429/121 |
| 2012/0317821 A1 * | 12/2012 | Tsuchiya | ................ | A01G 3/053 30/196 |
| 2019/0111582 A1 * | 4/2019 | Suzuki | ..................... | B27B 17/08 |
| 2021/0331304 A1 * | 10/2021 | Machida | .............. | B25D 17/043 |
| 2022/0408655 A1 * | 12/2022 | Zucca | .................... | A01G 3/053 |
| 2023/0023228 A1 * | 1/2023 | Li | ........................... | A01G 3/053 |

FOREIGN PATENT DOCUMENTS

| CN | 106508448 A | * | 3/2017 | ............. | A01G 3/053 |
| EP | 4520493 A1 | * | 3/2025 | ................ | B25F 5/02 |

OTHER PUBLICATIONS

English translation of CN-106508448-A, dated Mar. 22, 2017.*

* cited by examiner

*Primary Examiner* — Hwei-Siu C Payer
(74) *Attorney, Agent, or Firm* — Greenberg Traurig, LLP

(57) ABSTRACT

A handheld garden tool includes a housing, a control member, and a battery pack. The housing extends in the front and rear direction and is formed with an accommodation space. The control member is at least partially disposed in the accommodation space. The battery pack is detachably connected to the housing. In a projection plane perpendicular to the left and right direction, the projection of the control member in the projection plane in the left and right direction is a first projection, and the projection of the battery pack in the projection plane in the left and right direction is a second projection. The first projection at least partially overlaps the second projection.

11 Claims, 8 Drawing Sheets

HANDHELD GARDEN TOOL

RELATED APPLICATION INFORMATION

This application claims the benefit under 35 U.S.C. § 119(a) of Chinese Patent Application No. CN 202110806671.7, filed on Jul. 16, 2021, which application is incorporated herein by reference in its entirety.

BACKGROUND

A handheld electric tool refers to a small electric tool with electricity as a power source. An operator can operate a handheld electric tool by holding the handheld electric tool so as to implement certain functions. Such electric tools have two types of power sources, the first type supplying power through power connection cables and the second type supplying power through independent power supply apparatuses such as battery packs. An electric tool with a power source of the first type is restricted by sites of use, not easy to use, and unable to flexibly adapt to an outdoor working environment, thereby having relatively great limitations. An electric tool with a power source of the second type is convenient and flexible to use and is widely applied currently.

However, the ejection structure of an existing battery pack restricts the position of the control member in the battery pack, leading to a relatively large volume of the entire structure and resulting in inconvenient use.

Therefore, a handheld garden tool is urgently needed to solve the preceding technical problem in the existing art.

SUMMARY

A handheld garden tool includes a housing, a control member, and a battery pack. The housing extends in the front and rear direction and is formed with an accommodation space. The control member is at least partially disposed in the accommodation space. The battery pack is detachably connected to the housing. In a projection plane perpendicular to the left and right direction, the projection of the control member in the projection plane in the left and right direction is a first projection, and the projection of the battery pack in the projection plane in the left and right direction is a second projection. The first projection at least partially overlaps the second projection.

In one example, the rear portion of the housing extends upward to form a rear handle for a user to hold. The battery pack is detachably connected to the lower part of the rear handle.

In one example, the housing is provided with a first connection structure. The battery pack is provided with a second connection structure. The first connection structure is detachably connected to the second connection structure.

In one example, one of the first connection structure and the second connection structure is a protrusion, and the other of the first connection structure and the second connection structure is a recess.

In one example, the first connection structure is disposed at the periphery of the housing. The second connection structure is disposed at a position located at the upper end of the battery pack and corresponding to the first connection structure.

In one example, the battery pack is provided with an accommodation recess. The control member is at least partially located in the accommodation recess.

In one example, the accommodation recess is disposed on a plane where the battery pack is in contact with the housing. The shape of the accommodation recess matches the shape of the control member.

In one example, at least two second connection structures are provided. The at least two connection structures alternate with the control member.

A handheld garden tool includes a housing, a control member, and a battery pack. The housing is formed with an accommodation space. The control member is at least partially disposed in the accommodation space. The battery pack is connected to the housing. The surface of the housing protrudes outward to form a protrusion portion. The control member is disposed in the protrusion portion. The battery pack is provided with at least one accommodation recess. The at least one accommodation recess is formed on the surface where the battery pack is connected to the housing. The protrusion portion is at least partially disposed in the at least one accommodation recess.

In one example, the battery pack is detachably connected to the housing.

DETAILED DESCRIPTION

The technical solutions of the present disclosure are described clearly and completely hereinafter in conjunction with drawings. The described examples are part, not all, of the examples of the present disclosure. Based on examples of the present disclosure, all other examples obtained by those of ordinary skill in the art without creative work are within the scope of the present disclosure.

In the description of the present disclosure, it is to be noted that orientations or position relations indicated by terms such as "center", "upper", "lower", "left", "right", "vertical", "horizontal", "in", and "out" are based on the drawings. These orientations or position relations are intended only to facilitate and simplify the description of the present disclosure and not to indicate or imply that an apparatus or element referred to must have such particular orientations or must be configured or operated in such particular orientations. Thus, these orientations or position relations are not to be construed as limiting the present disclosure. In addition, terms such as "first" and "second"

are used only for the purpose of description and are not to be construed as indicating or implying relative importance. Terms "first position" and "second position" are two different positions.

In the description of the present disclosure, it is to be noted that terms "mounted", "joined", and "connected" are to be understood in a broad sense unless otherwise expressly specified and limited. For example, the term "connected" may refer to "securely connected" or "detachably connected", may refer to "mechanically connected" or "electrically connected" or may refer to "connected directly", "connected indirectly through an intermediary" or "connected inside two components". For those of ordinary skill in the art, meanings of the preceding terms in the present disclosure may be understood based on situations.

An example provides an electric tool, and the electric tool may be a handheld electric tool. In some other examples, the electric tool may be a handheld garden tool. In this example, the handheld garden tool is a pruner 100. As a garden tool, the pruner 100 can be operated by a user to trim vegetation including shrubs and hedges.

Figure 1:
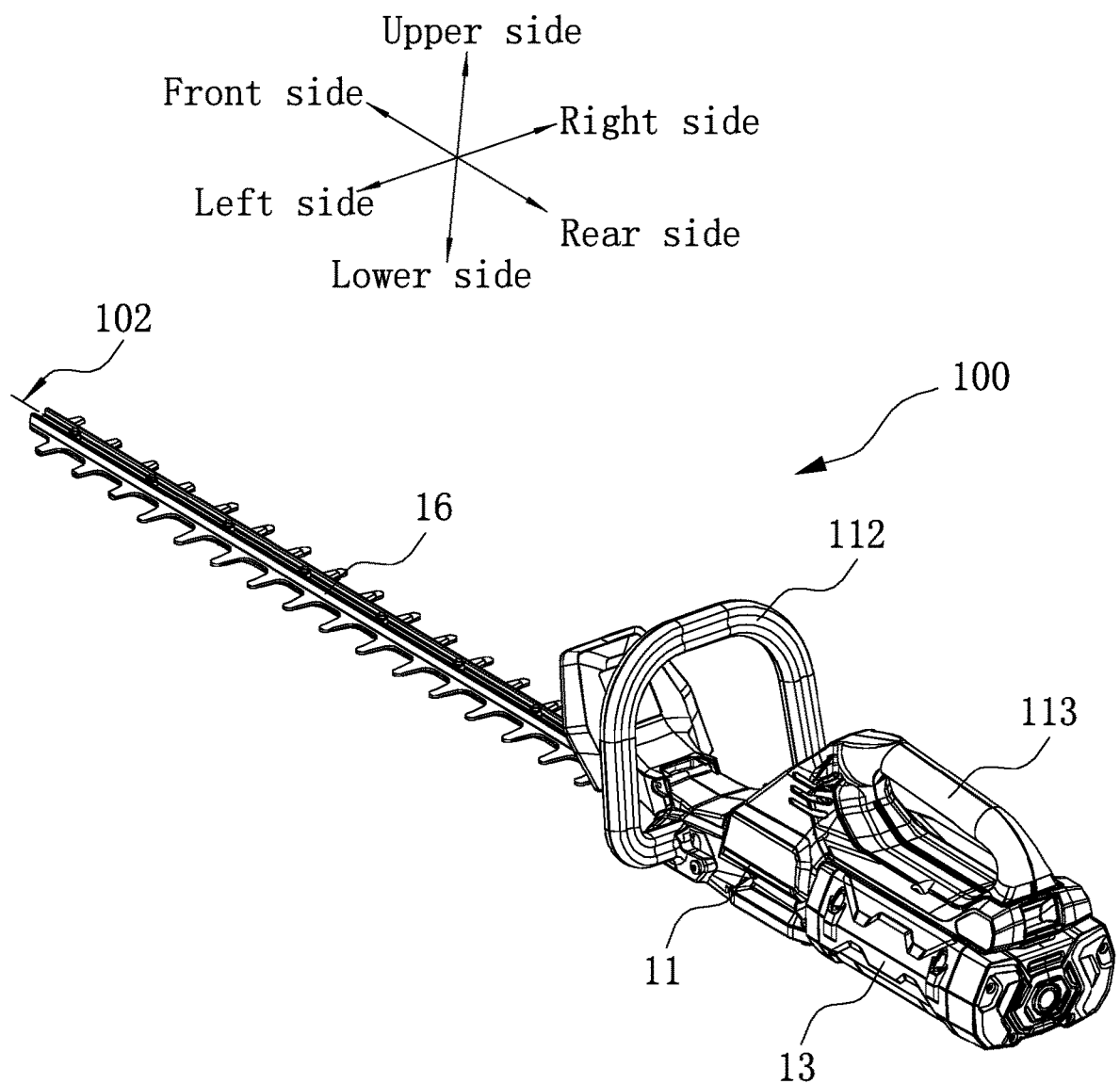
FIG. 1 is a view illustrating the structure of a handheld garden tool according to an example of the present disclosure.

As shown in FIGS. 1 to 6, the pruner 100 includes a housing 11, a motor 12, a power supply member, a control member 14, a transmission member 15, a blade member 16, and an operating member. To facilitate the description of the technical solutions of the present disclosure, directions indicated by arrows in FIG. 1 are defined as upper side, lower side, left side, right side, front side, and rear side respectively. In other examples, the handheld electric tool may be other garden tools besides the pruner 100, and correspondingly, the blade member is another functional element that can realize a tool function.

The housing 11 extends in the front and rear direction and is formed with an accommodation space 111. The accommodation space 111 is configured to accommodate the motor 12 and the transmission member 15. The motor 12 is an electric motor. The housing 11 is also formed with or connected to a front handle 112 and a rear handle 113. The front handle 112 is connected to the outer wall of the housing 11. The rear handle 113 is extended from the housing 11. The motor 12 and the transmission member 15 are each accommodated in the accommodation space 111. The motor 12 is configured to drive the blade member 16 to implement a cutting function. The motor 12 also includes a motor shaft rotatable around a motor axis 101. The transmission member 15 is configured to implement the power transmission between the motor 12 and the blade member 16. One part of the blade member 16 is accommodated in the accommodation space 111 of the housing 11, and the other part of the blade member 16 extends out of the housing 11 in the direction of a longitudinal axis 102. The longitudinal axis 102 of the blade member 16 is perpendicular to the motor axis 101. The power supply member is configured to supply power to the motor 12. The power supply member may be a direct-current power supply. For example, in this example, the power supply member includes a battery pack 13 detachably mounted to the housing 11. In other examples, the power supply member may also be an alternating-current apparatus. In this case, the power supply member includes an AC power plug capable of connecting to the outside. The operating member is configured to be operated by the user to control the pruner 100 to work. Specifically, when the operating member is triggered by the user, the control member 14 controls the motor 12 to start. The control member 14 comprises a circuit board 141 disposed in the housing 11.

The rear portion of the housing 11 extends upward to form the preceding rear handle 113. The front handle 112 is securely mounted to the housing 11. That is, in this example, the rear handle 113 is formed through the housing 11, and the front handle 112 is independent of the housing 11 and is secured to the housing 11 through a fastening piece. Of course, it is to be understood that the front handle 112 may also be integrally formed with the housing 11 in other examples. The front handle 112 is disposed on the front side of the rear handle 113 to enable the user to hold the front handle 112 and the rear handle 113 with both hands when the user operates the pruner 100 to perform cutting, thereby implementing a more stable operation. Specifically, the rear handle 113 and the motor 12 are disposed on the same side of the front handle 112. The front handle 112 is closer to the blade member 16 than the rear handle 113. The front handle 112 is spaced apart from the rear handle 113 in the direction of the longitudinal axis 102 so that the user can control the pruner 100 more stably. Preferably, the front handle 112 extends in a direction perpendicular to the longitudinal axis 102 and the front handle 112 spans the pruner 100 in the left and right direction. In this case, when the user performs flat cutting, the user can hold the rear handle 113 with one hand and hold the front handle 112 with the other hand so as to implement stable cutting.

Figure 2:
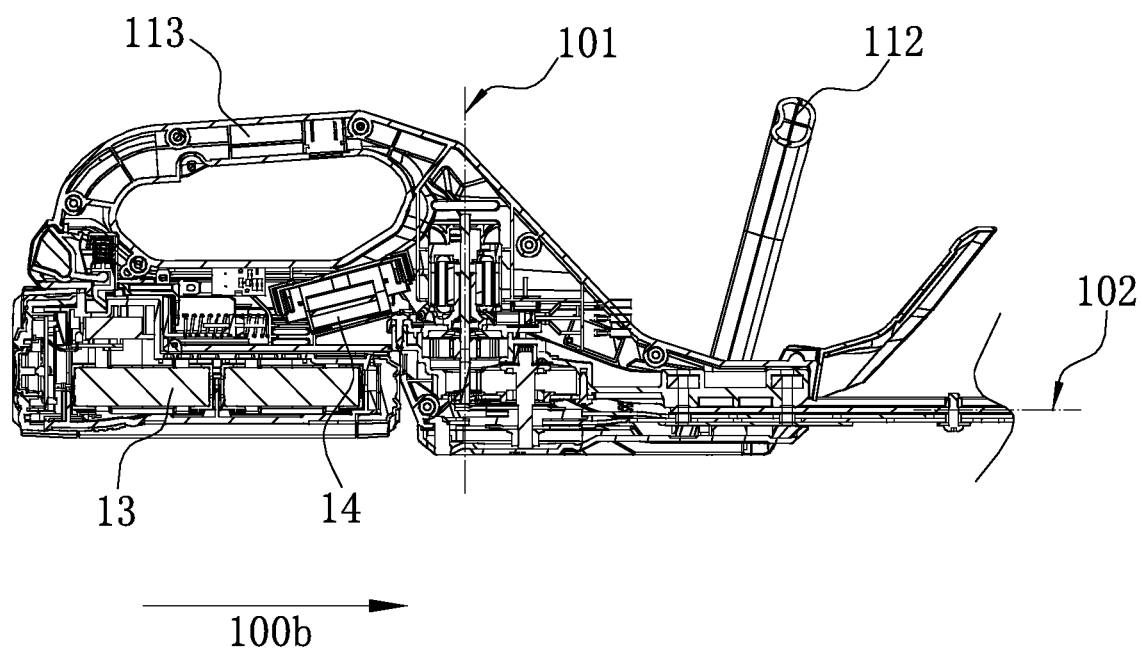
FIG. 2 is a section view of the handheld garden tool according to an example of the present disclosure.
Figure 5:
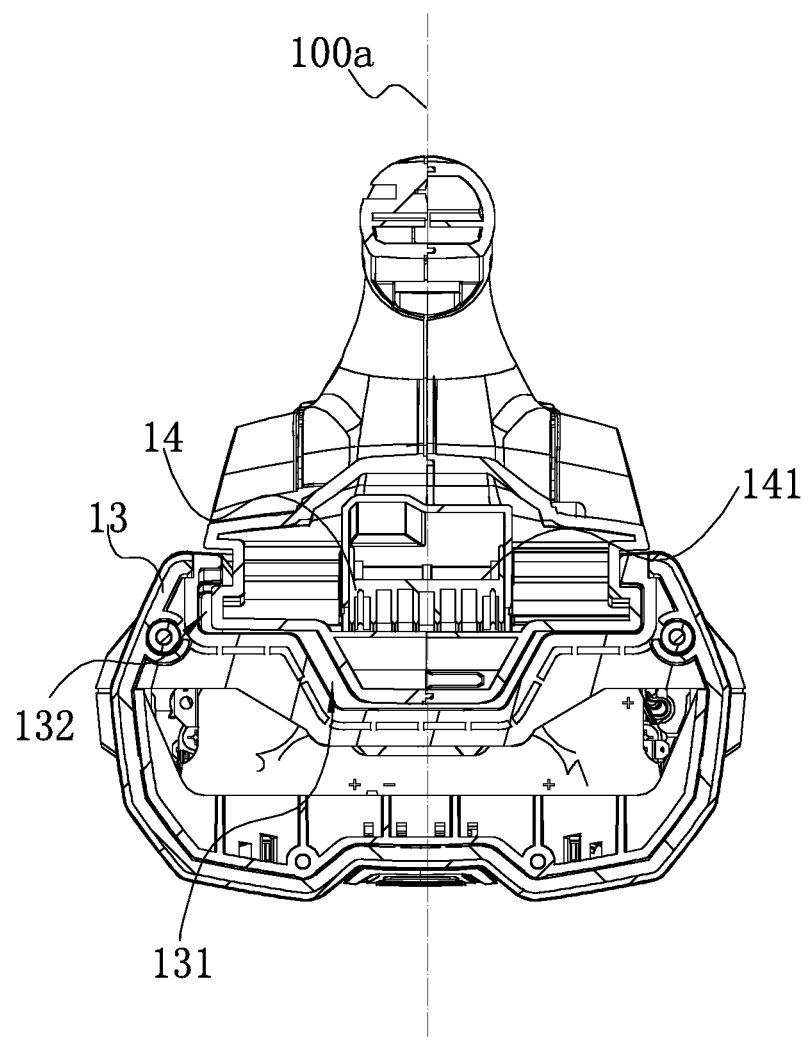
FIG. 5 is a rear view of the structure shown in FIG. 2.
Figure 6:
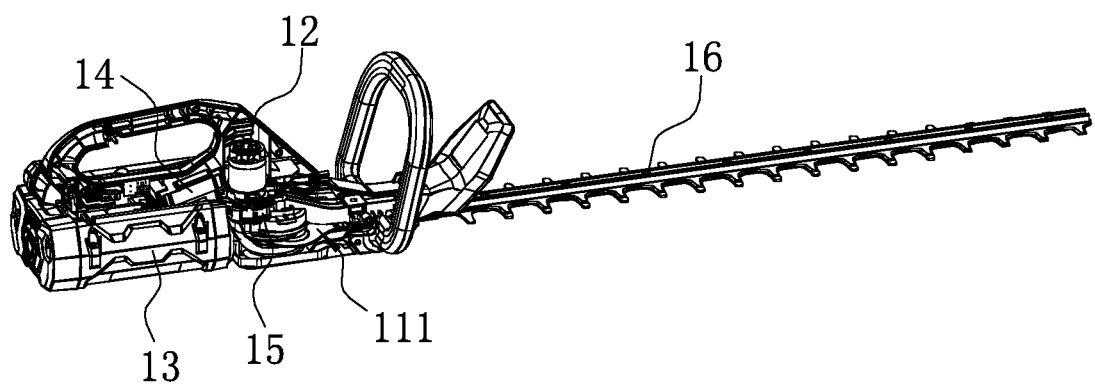
FIG. 6 is a view illustrating the structure of the handheld garden tool from another perspective according to an example of the present disclosure.
Figure 7:
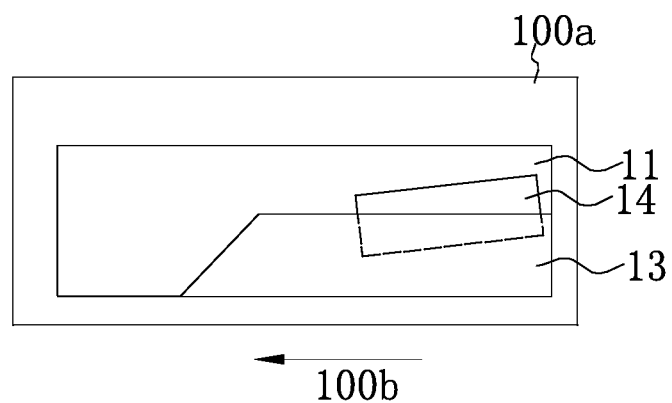
FIG. 7 is a view illustrating the projection relationship of the handheld garden tool according to an example of the present disclosure.

In this example, the control member 14 is at least partially disposed in the accommodation space 111. As shown in FIGS. 2, 5, and 7, in a projection plane 100a perpendicular to the left and right direction, the projection of the control member 14 in the projection plane 100a in the left and right direction is a first projection, and the projection of the battery pack 13 in the projection plane 100a in the left and right direction is a second projection. The first projection at least partially overlaps the second projection. That is, the control member 14 is at least partially located above the battery pack 13.

The battery pack 13 is detachably coupled to the housing 11 along a connection direction 100b, and the projection plane 100a is basically parallel to the connection direction 100b.

Figure 4:
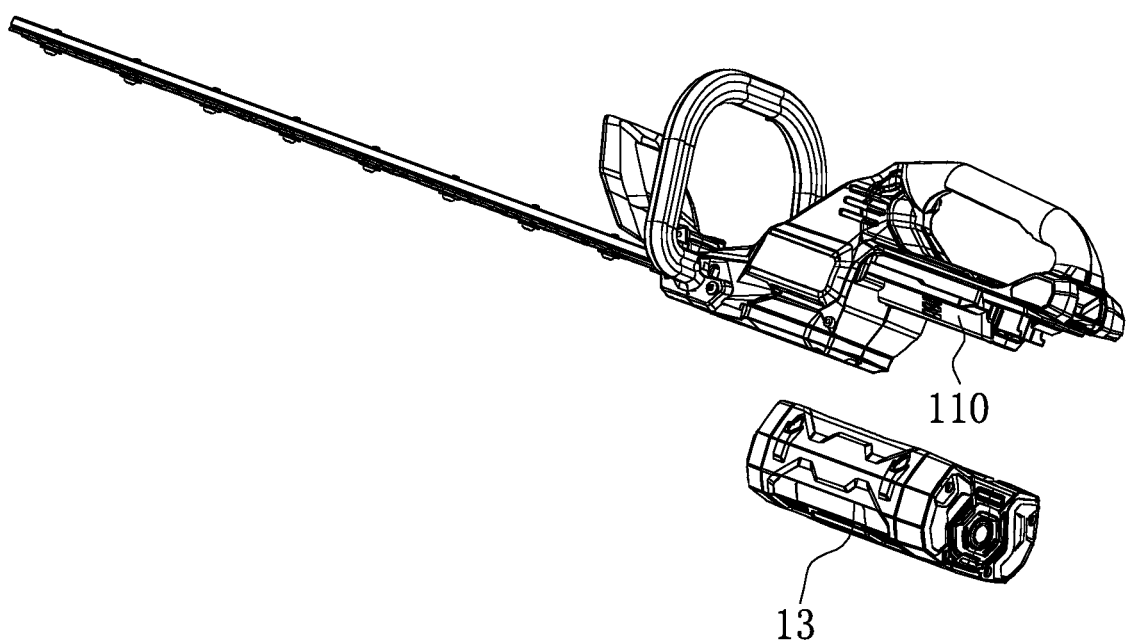
FIG. 4 is an exploded view illustrating the structure of the handheld garden tool from another perspective according to an example of the present disclosure.

In an optional technical solution, as shown in FIGS. 2 and 4, an included angle is set between the control member 14 and the longitudinal axis 102. That is, the control member 14 is disposed obliquely in the projection plane 100a perpendicular to the left and right direction. Optionally, the battery pack 13 is provided with an accommodation recess 131. The control member 14 is at least partially located in the accommodation recess 131. The arrangement in which the battery pack 13 is provided with the accommodation recess 131 enhances the structural compactness of the battery pack 13 and control member 14. A housing of the battery pack 13 is recessed inward to form the accommodation recess 131. That is to say, the accommodation recess 131 is a groove on the surface of the housing of the battery pack 13.

Preferably, the accommodation recess 131 is disposed on a plane where the battery pack 13 is in contact with the housing 11. The shape of the accommodation recess 131 matches the shape of the control member 14. In this structure, a protrusion part of the control member 14 can be disposed in the accommodation recess 131. The arrangement in which the shape of the accommodation recess 131 matches the shape of the control member 14 can further enhance the structural compactness of the battery pack 13 and control member 14.

The surface of the housing 11 protrudes outward to form a protrusion portion 110. The control member 14 is disposed in the protrusion portion 110. The battery pack 13 is provided with the accommodation recess 131. The accommodation recess 131 is formed on the surface where the battery pack 13 is connected to the housing 11. The protrusion portion 110 is at least partially disposed in the accommodation recess 131. The protrusion portion 110 is inserted into the accommodation recess 131. In this structure, the control member 14 is disposed in the protrusion portion 110 and disposed in the accommodation recess 131, enhancing structural compactness and protecting the control member 114.

The battery pack 13 is detachably connected to the lower part of the rear handle 113. Specifically, the housing 11 is provided with a first connection structure 114. The battery pack 13 is provided with a second connection structure 132. The first connection structure 114 is detachably connected to the second connection structure 132 so as to implement the connection between the battery pack 13 and the housing 11. Optionally, one of the first connection structure 114 and the second connection structure 132 is a protrusion, and the other of the first connection structure 114 and the second connection structure 132 is a recess. The protrusion engages with the recess in a snap-fit manner. In this example, a description is made with an example in which the first connection structure 114 is a protrusion and the second connection structure 132 is a recess.

The first connection structure 114 is disposed at the periphery of the housing 11. The second connection structure 132 is disposed at a position located at the upper end of the battery pack and corresponding to the first connection structure 114. The position of the first connection structure 114 can be selected according to an actual assembly situation as long as the battery pack 13 and the housing 11 can be assembled. Optionally, to guarantee a stable connection and assembly, at least two first connection structures 114 and at least two second connection structures 132 are provided.

In this example, the battery pack 13 is detachably combined with the housing 11 in the direction of the longitudinal axis 102 (that is, the front and rear direction). Preferably, a second connection structure 132 is a strip-shaped sliding recess extending in the direction of the longitudinal axis 102 to play a guiding and limiting role. A first connection structure 114 is a strip-shaped sliding rail adapted to a strip-shaped sliding recess.

Figure 3:
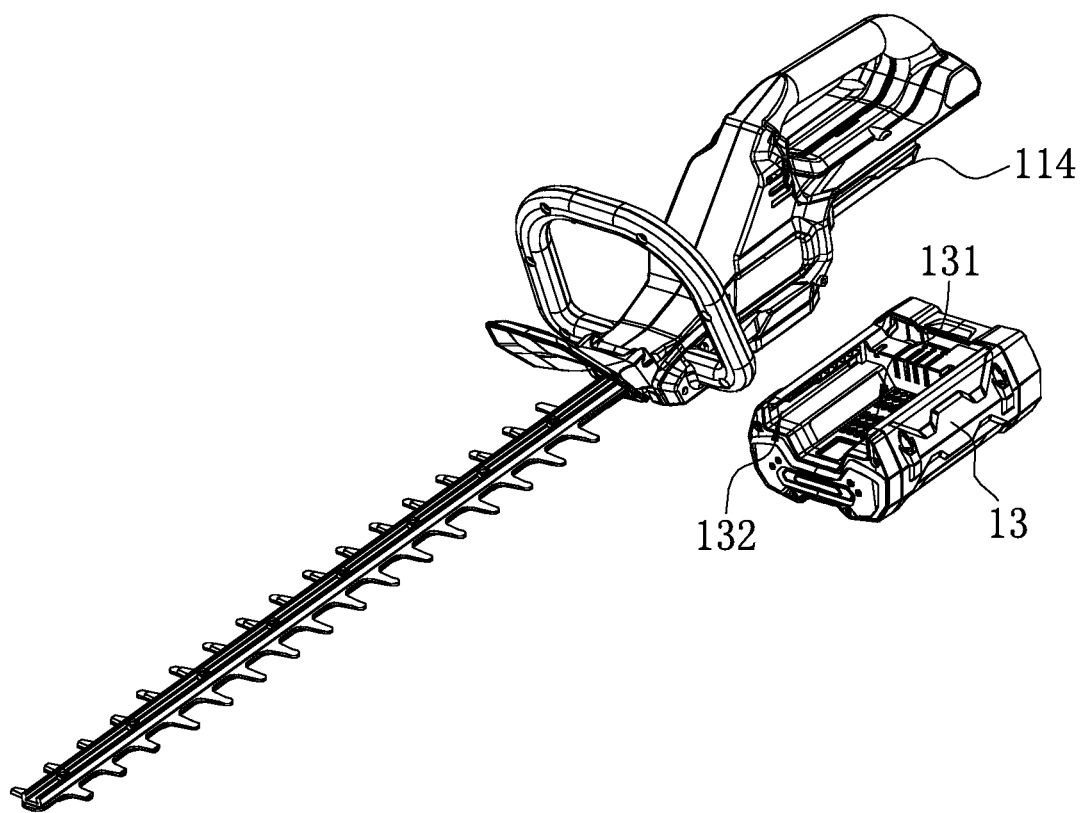
FIG. 3 is an exploded view illustrating the structure of the handheld garden tool according to an example of the present disclosure.

Optionally, in this example, as shown in FIG. 3, two first connection structures 114 are provided. One of the two first connection structures 114 is disposed on the left outer sidewall of the rear handle 113. The other of the two first connection structures 114 is disposed on the right outer sidewall of the rear handle 113. In the projection plane 100a perpendicular to the left and right direction, a first connection structure 114 is located below the rear handle 113. That is, in the projection plane 100a, the projection of a first connection structure 114 does not overlap the projection of the rear handle 113. Second connection structures 132 are disposed on two opposite inner sidewalls of the upper end of the battery pack 13. Specifically, the upper surface of the battery pack 13 is provided with a recess structure. An opening of the recess structure faces upward. Two opposite sidewalls of the recess structure turn inward to form strip-shaped sliding recesses, that is, the second connection structures 132, in the direction of the longitudinal axis 102. A first connection structure 114 is detachably connected to a strip-shaped sliding recess. In this case, the accommodation recess 131 is disposed at the bottom of the preceding recess structure and communicates with the second connection structures 132 on two sides of the accommodation recess 131.

In another optional example, the second connection structures 132 alternate with the accommodation recess 131. Specifically, a first connection structure 114 is disposed on the lower surface of the housing 11, a second connection structure 132 is disposed on the upper surface of the battery pack 13, and the second connection structure 132 is detachably connected to the first connection structure 114. Optionally, two first connection structures 114 and two second connection structures 132 are provided. The two first connection structures 114 correspond to and are detachably connected to the two second connection structures 132 in a one-to-one manner. Preferably, a first connection structure 114 and a second connection structure 132 may form a T-shaped recess matching structure or a dovetail-shaped recess matching structure, which is not limited in this example. In this structure, the accommodation recess 131 is disposed on the upper surface of the battery pack 13 and alternates with the second connection structures 132. That is, the two second connection structures 132 are disposed on two sides of the accommodation recess 131.

The handheld garden tool provided in this example is improved and optimized in terms of the structural layout of the battery pack 13 and control member 14, thereby making the structure of the handheld garden tool simple and compact and the handheld garden tool easy to use and thus improving the user experience.

Figure 8:
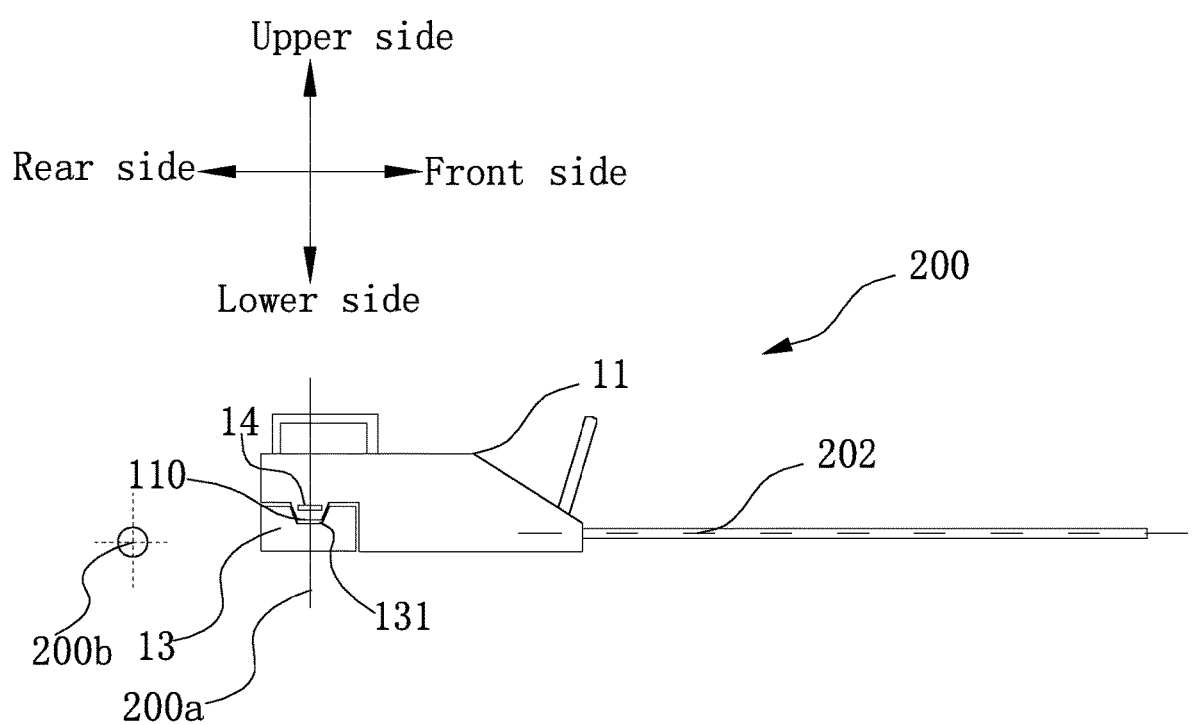
FIG. 8 is a schematic side elevation view of the handheld garden tool according to an example of the present disclosure.

The handheld garden tool 200 of another example shown in FIG. 8 has basically the same structure as the handheld garden tool in FIG. 1. The main difference between the hand-held garden tool 200 and the pruner 100 of the first example is that a connection direction 200b in which a battery pack 13 is coupled to the housing 11 extends along a left-right direction. The connection direction 200b is perpendicular to a front-rear direction, that is, the connection direction 200b is perpendicular to a longitudinal axis 202. As shown in FIG. 8, the connection direction 200b is also a direction perpendicular to the paper surface in FIG. 8.

In this example, in a projection plane 200a parallel to the connection direction 200b, the projection of the battery pack 13 in the projection plane 200a at least partially coincides with the projection of a control member 14 in the projection plane 200a. Similarly, the battery pack 13 is recessed to form an accommodation recess 131, the housing 11 is protruded with a protrusion portion 110, the protrusion portion 110 is embedded in the accommodation recess 131, and the control member 14 is at least partially arranged in the accommodation recess 131.

What is claimed is:
1. A handheld garden tool, comprising:
a housing extending in a front and rear direction and formed with an accommodation space;
an electric motor disposed within the accommodation space;
a blade member coupled to the electric motor by a transmission assembly, the electric motor driving the blade member to implement a vegetation cutting function;
a control member at least partially disposed in the accommodation space; and
a battery pack detachably connected to the housing,
wherein in a projection plane, perpendicular to a left and right direction relative to the housing, a projection of the control member in the projection plane perpendicular to the left and right direction is a first projection, a projection of the battery pack in the projection plane perpendicular to the left and right direction is a second projection, and the first projection at least partially overlaps the second projection.

2. The handheld garden tool according to claim 1, wherein a rear portion of the housing extends upward to form a rear handle for a user to hold and the battery pack is detachably disposed at a lower part of the rear handle.

3. The handheld garden tool according to claim 1, wherein the housing is provided with a first connection structure, the battery pack is provided with a second connection structure, and the first connection structure is detachably connected to the second connection structure.

4. The handheld garden tool according to claim 3, wherein one of the first connection structure or the second connection structure is a protrusion and the other of the first connection structure or the second connection structure is a recess.

5. The handheld garden tool according to claim 3, wherein the first connection structure is disposed at a surface of the housing, and the second connection structure is disposed at a position located at an upper end of the battery pack and corresponding to the first connection structure.

6. The handheld garden tool according to claim 1, wherein the battery pack is provided with an accommodation recess and the control member is at least partially located in the accommodation recess.

7. The handheld garden tool according to claim 6, wherein the accommodation recess is disposed on a plane where the battery pack is in contact with the housing and a shape of the accommodation recess matches a shape of the control member.

8. The handheld garden tool according to claim 1, wherein the battery pack is detachably coupled to the housing along a connection direction and the projection plane is substantially parallel to the connection direction.

9. The handheld garden tool according to claim 1, wherein the battery pack comprises a battery pack housing and the battery pack housing is recessed inward to form an accommodation recess and the control member is at least partially disposed in the accommodation recess when the battery pack is coupled to the housing or the handheld garden tool.

10. The handheld garden tool according to claim 9, wherein a surface of the housing protrudes outward to form a protrusion portion inserted into the accommodation recess and the control member is at least partially disposed in the protrusion portion.

11. A handheld garden tool, comprising:
a housing formed with an accommodation space;
a functional element for realizing a tool function;
an electric motor for driving the functional element;
a control member configured to control the electric motor and disposed in the accommodation space; and
a battery pack detachably connected to the housing,
wherein a surface of the housing protrudes outward to form a protrusion portion for coupling with an accommodating recess formed on the battery pack and mechanically supporting the battery pack when the battery pack is connected to the housing, the control member is disposed in the protrusion portion, and the control member is at least partially located in the accommodation recess when the battery pack is mounted on the housing.

* * * * *